Patented Mar. 2, 1937

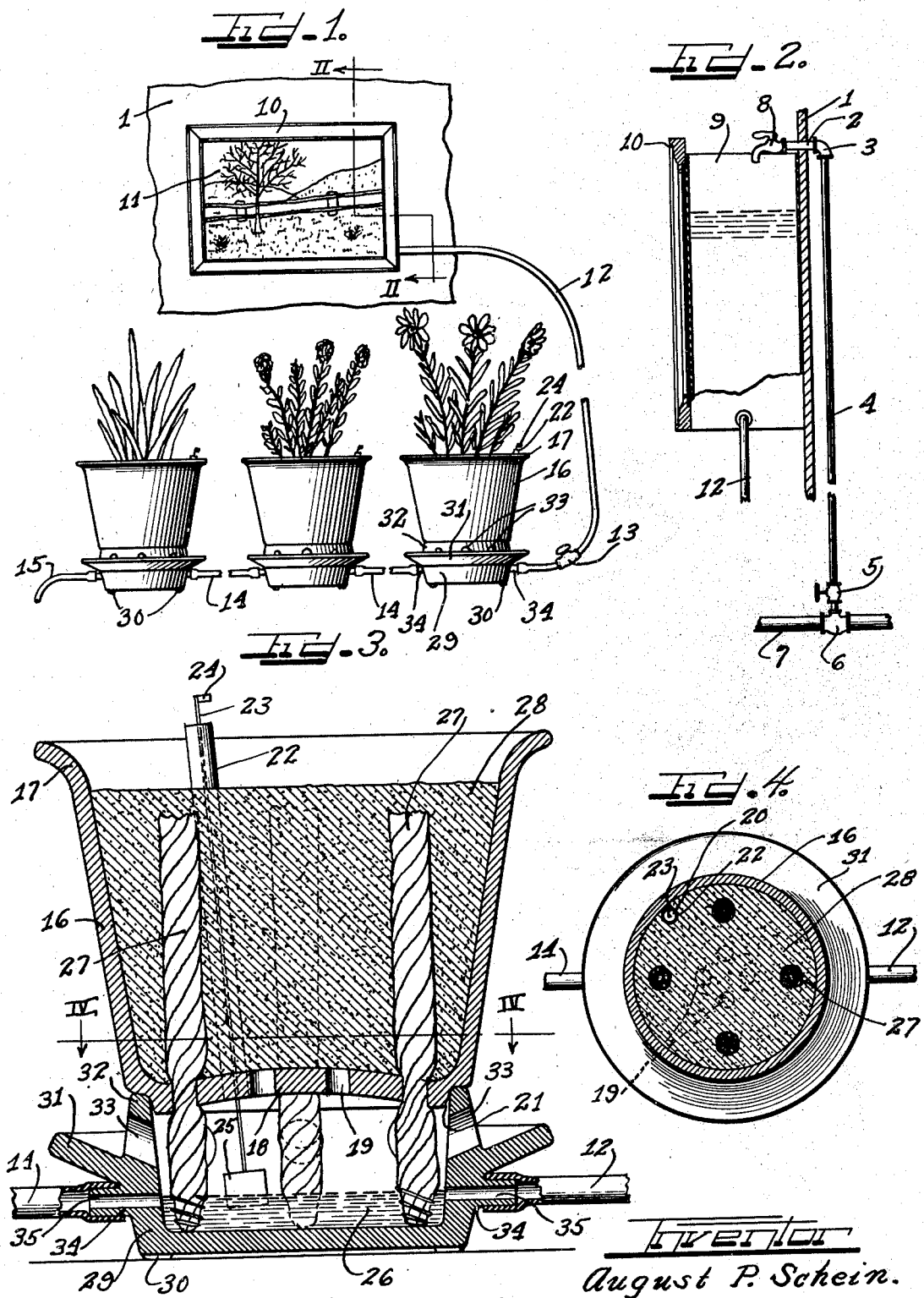

2,072,185

UNITED STATES PATENT OFFICE 2,072,185

FLOWERPOT WATERING SYSTEM

August P. Schein, Chicago, Ill.

Application November 16, 1935, Serial No. 50,094

4 Claims. (Cl. 47—38)

This invention relates to self-watering flower pots, of the ventilated type, adapted to be used individually or in series for connection with a controlled water supply to provide a system whereby a substantially constant level of water is kept within the flower pot saucers or bases having stub means associated therewith and projecting upwardly through the flower pot and also having asbestos water feed wicks whereby moisture from the saucers or bases is adapted to be carried upwardly into the flower pot to carry moisture into the soil for the propagation of plants.

It is an object of this invention to provide a watering system whereby a plurality of self-watering flower pots may be connected together in series permitting the level of water in the flower pot bases to be maintained at substantially a constant level assisted by means of float mechanisms associated with the flower pots.

It is also an object of this invention to provide a self-watering flower pot system wherein the water supply bases of the flower pots are connected in series and are also connected with a common supply of water kept at a constant level in a supply tank by means of a drip system which is regulated to supply water to the supply system in amounts corresponding to the amounts which are withdrawn from the water supply saucers or bases of the flower pots due to evaporation and due to the transmission of water to the soil within the flower pots by means of attachments forming a part thereof.

It is a further object of this invention to provide a self-watering flower pot provided with an apertured bottom and associated with a ventilated water carrying saucer or base into which asbestos wicks carried by the flower pot are adapted to project into the water carried in the saucer or base for the purpose of carrying moisture upwardly to the soil within the flower pot.

It is furthermore an object of this invention to provide a flower pot watering system wherein a common water supply tank is connected in series with a plurality of connected flower pot bases to maintain a substantially constant level of water in said bases to feed water upwardly through asbestos wicks into the soil contained within the flower pots supported on the bases.

It is an important object of this invention to provide a self-watering flower pot system wherein a plurality of flower pots are connected to a common water supply and wherein each of the flower pots is adapted to be ventilated by means of an apertured bottom positioned over a ventilated base containing water which is adapted to be fed into the soil of the flower pot by means of asbestos wicks, each of said flower pots having associated therewith a float indicator projecting upwardly through the flower pot so that the same can be easily read to designate the amount of water contained in the flower pot base or saucer.

Other and further important objects of this invention will be apparent from the disclosures in the specification and the accompanying drawing.

The invention (in a preferred form) is illustrated in the drawing and hereinafter more fully described.

On the drawing:

Figure 1 is a front elevation of the flower pot watering system with parts of the water supply tubing broken away.

Figure 2 is an enlarged vertical sectional view taken on line II—II of Figure 1 with parts broken away.

Figure 3 is an enlarged vertical central section through one of the flower pots with parts shown in elevation.

Figure 4 is a reduced horizontal section taken on line IV—IV of Figure 3.

As shown on the drawing:

The reference numeral 1 indicates a partition or supporting wall through which a water supply pipe arm or tube 2 projects. The rear end of the pipe arm 2 is connected by means of an elbow 3 to the upper end of an auxiliary water feed tubing or pipe 4 having a control valve 5 secured therein in a convenient position. The auxiliary supply pipe 4 is connected by means of a coupling 6 to a main water feed pipe 7. Mounted on the projecting front end of the water supply arm 2 is a drip faucet 8 which is positioned above a water supply tank 9 constructed of glass or other suitable material. A frame 10 forms a part of the front of the tank 9 and serves as a frame for a picture 11 painted on the front surface of the front wall of the tank. Projecting through the lower portion of one of the side walls of the tank 9 is a water feed tube 12 which is provided with a control valve 13 near the discharge end thereof.

As illustrated in Figure 1, the flower pot watering system includes one or more self-watering flower pot units, three of which are shown for the purpose of demonstration. The three flower pot units are connected in series one to another by means of coupling tubes 14, while the last flower pot has connected with the saucer or base thereof a discharge or drain tube 15 for the purpose of discharging the overflow water from the system into a drain or the like.

Each of the self-watering flower pot units has a pot or body 16 of a frusto-conical or other desired shape and constructed of glass, porcelain, pottery or metal if desired. The upper end of the pot 16 has the margin thereof deflected outwardly to provide a curved rim 17. The pot is formed with an arched bottom 18 provided with a plurality of drainage and ventilating openings 19 and with an opening 20 as illustrated in Figure 4. As clearly illustrated in Figure 3, the bottom end of the pot 16 is provided with a groove 21 to form a shoulder at the bottom end of the pot to permit the same to be seated upon a supporting base or saucer hereinafter described.

Each of the flower pots is provided with a water level indicating mechanism which includes a guide pipe or tube 22 the lower end of which is rigidly and tightly secured in the opening 20 in the bottom 18 of the pot. The tube 22 is a guide tube and projects upwardly through the soil 28 in the pot slightly above the rim 17 as shown in Figure 3. Projecting upwardly through the guide tube 22 is a float stem or rod 23, the upper projecting end of which may be provided with graduation marks if so desired. Secured at right angles to the upper end of the float stem 23 is a flag or arm 24. Secured to the lower end of the float stem 23 is a float 25 which is positioned to float in the water 26 contained within the base or saucer of the flower pot unit.

Disposed within the flower pot 16 are a plurality of asbestos wicks 27, the drawing showing four in number with the wicks projecting through four of the bottom openings 19 allowing the lower projecting ends of the wicks to project into the water 26 within the base unit to permit saturation of the wicks so that moisture may be carried upwardly into the flower pot to moisten the soil 28.

Each of the base units or saucers of the flower pot unit comprises a water containing bowl or tray 29 provided with a plurality of spaced feet or knobs 30 for supporting the bottom of the tray 29 above a support to provide ventilation for the bottom of the base or saucer and prevent moisture from the sweating of the base from wetting the surface of the table or other support upon which the flower pot unit is standing. The tray 29 is provided with an outwardly deflected rim 31. Integrally formed on the tray 29 and on the rim 31 thereof is a supporting ring 32 which forms a seat for receiving the bottom of the flower pot 16. The ring 32 is provided with a plurality of ventilating openings 33 to permit air to circulate through the base or saucer below the flower pot and above the water contained in the tray 29 forming part of the base. As clearly illustrated in Figures 1 and 3, the apertured supporting ring 32 projects upwardly above the saucer rim 31 into the groove 21 formed in the bottom of the flower pot 16. Integrally formed on opposite sides of the saucer tray 29 are diametrically opposite or axially projecting nozzles or pipe studs 34. Each of the pipe studs 34 is provided with a passage 35 which extends from the outer end of the stud inwardly through the wall of the tray 29 to communicate with the water containing chamber of the flower pot base or saucer. Connected to one of the pipe studs 34 of the first flower pot, as illustrated in Figure 1, is the lower end of the water supply tube 12. The connecting tubes 14 are engaged on the projecting ends of the pipe studs 34 of the flower pot bases to connect the flower pots in series to permit water to be supplied into the water chambers of the trays 29 of the series of flower pots. The drain tube 15 is connected to one of the pipe studs 34 of the last flower pot base.

The series of flower pot units are connected by means of the water supply tube 12 to the water supply tank 9 as described and the water in said tank is maintained substantially at a desired level by means of water which is supplied through the drip faucet 8 preferably in drops or in an amount proportionate to the amount of water taken up by the flower pot wicks 27 from the water 26 contained in the base trays 29 so that the amount of water in the base trays is maintained at a substantially constant level to provide moisture for the soil 28 contained within the flower pots. The moisture or water from the flower pot base trays is taken up by means of the asbestos wicks and carried into the soil. Any excess moisture in the soil is permitted to drain downwardly through the soil and out through the base openings 19 to drip back into the base tray. The openings 19 in the bottoms of the flower pots and the ventilating openings 33 in the ring members of the saucers or bases serve to permit proper ventilation of the bases and the flower pots so that the soil is always maintained fresh and sweet. With the float 25 seated in the water contained in the base 29, the upper projecting graduated end of the float stem 23 projects above the upper end of the guide tube 22 to permit an observer to readily ascertain the amount of water in the base tray. The control valves 5 and 13 are provided to permit proper control of the water supply from the main supply pipe 7 and the flow of water from the tube 12 to the various base trays 29 of the flower pots which are connected in series.

Attention is called to the flower pot wicks 27 which are constructed of asbestos. It has been found that wicks constructed of asbestos will not rot or deteriorate, as do the ordinary wicks, but will last indefinitely, thereby making the same particularly adaptable for use in flower pots of the type herein described.

It will of course be understood that various details of construction may be varied through a wide range without departing from the principles of this invention, and it is therefore not the purpose to limit the patent granted hereon otherwise than necessitated by the scope of the appended claims.

I claim as my invention:

1. A flower pot watering system comprising a water supply tank, a plurality of flower pot units, means for connecting the water supply tank and said flower pot units in series, said flower pot units each comprising a base having ventilating apertures therein, passaged stud members integrally formed on the base whereby the bases may be connected one to another, a pot having a grooved apertured bottom for removably seating the pot on the apertured base, asbestos wicks in the pot and projecting through openings in the bottom of the pot into the base, and gauge means in the base and pot for indicating the amount of water in the base.

2. A flower pot watering system comprising a flower pot unit, means connected therewith for supplying water thereto in predetermined quantities, said flower pot unit comprising a rimmed base for carrying a supply of water, a ring formed on said rimmed base and having air ventilating apertures therein, a pot having a plurality of apertures in the bottom thereof and also having a bottom groove to permit the pot to be seated on the apertured ring of the base, and wick members in the pot projecting through selected openings in the bottom thereof and into the base to absorb water from the base and carry the water upwardly into the pot.

3. In a flower pot watering system a flower pot unit comprising a base having a water supply passage and a water discharge passage therein, an upwardly projecting ring on the base having apertures therein for ventilating the base, an apertured pot supported on said ring, and asbestos wicks in said pot projecting down through selected openings in the bottom of the pot and into the base to absorb water therefrom.

4. A flower pot unit comprising a saucer base, legs on the bottom thereof, an upwardly projecting apertured ring integrally formed on the saucer base, a pot having a grooved bottom removably seated on the apertured ring said bottom having a plurality of apertures therein, a plurality of asbestos wicks in the pot projecting down through selected apertures of the pot bottom to project downwardly through the apertured ring and into the saucer base to absorb water therefrom and carry the water upwardly into the pot, a guide tube secured in the apertured bottom and projecting upwardly through the pot to project thereabove, and float indicating means in the saucer base including a float stem which projects upwardly through the guide tube in the pot and out of the top of said tube and having an element thereon to indicate the amount of water contained in the saucer base.

AUGUST P. SCHEIN.